US008773997B1

(12) United States Patent
Lin

(10) Patent No.: US 8,773,997 B1
(45) Date of Patent: Jul. 8, 2014

(54) MESSAGING GATEWAY SYSTEM WITH REAL-TIME MESSAGE ALLOCATION COMPUTER

(75) Inventor: Zhijian Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 889 days.

(21) Appl. No.: 12/692,366

(22) Filed: Jan. 22, 2010

(51) Int. Cl.
*G06F 11/00* (2006.01)

(52) U.S. Cl.
USPC ........... 370/235; 370/230; 370/232; 370/231; 455/466; 455/412.1

(58) Field of Classification Search
CPC ......................... H04M 3/42382; H04M 7/0042
USPC ............................. 370/235, 468; 709/224, 229
See application file for complete search history.

(56) References Cited

U.S. PATENT DOCUMENTS

| 5,878,351 | A * | 3/1999 | Alanara et al. ................ 455/466 |
| 6,961,309 | B2 * | 11/2005 | Carlson et al. ................ 370/235 |
| 7,433,369 | B2 * | 10/2008 | Shibasaki ...................... 370/468 |
| 8,305,895 | B2 * | 11/2012 | Chang et al. .................. 370/232 |
| 2001/0033642 | A1 * | 10/2001 | Abrishami et al. ...... 379/100.01 |
| 2003/0026291 | A1 * | 2/2003 | Engel ............................. 370/468 |
| 2003/0118160 | A1 * | 6/2003 | Holt et al. .................. 379/88.12 |
| 2005/0266864 | A1 | 12/2005 | Chen et al. |
| 2006/0114932 | A1 * | 6/2006 | Cai et al. ....................... 370/466 |
| 2006/0168318 | A1 * | 7/2006 | Twiss ............................ 709/238 |
| 2007/0136592 | A1 * | 6/2007 | Smith ........................... 713/171 |
| 2008/0153521 | A1 | 6/2008 | Benaouda et al. |
| 2009/0070454 | A1 * | 3/2009 | McKinnon et al. ........... 709/224 |
| 2012/0088530 | A1 * | 4/2012 | Smith et al. .................. 455/466 |

OTHER PUBLICATIONS

Network Working Group, The Web Socket protocol, draft-hixie-thewebsocketprotocol-55, Standards Track Nov. 2, 2009, Internet-Draft Google, Inc.*

* cited by examiner

*Primary Examiner* — Hassan Kizou
*Assistant Examiner* — Amy Ling

(57) ABSTRACT

A real-time message allocation computer in a messaging gateway system may determine the maximum amount of message traffic for each of a plurality of message provider systems based on information indicative of the magnitude of message traffic that is received by the messaging gateway system from each of the message provider systems.
A message delivery controller in a message provider system may throttle the messages from the message provider system to a messaging gateway system so that the message traffic does not exceed information indicative of a maximum amount of message traffic which is received from the messaging gateway system.

26 Claims, 4 Drawing Sheets

MESSAGING GATEWAY SYSTEM WITH REAL-TIME MESSAGE ALLOCATION COMPUTER

BACKGROUND

1. Technical Field

This disclosure relates to messaging gateway systems that may be used as gateways between computer network communication systems and mobile communication systems.

2. Description of Related Art

Mobile communication devices, such as cell phones, are often configured to receive electronic messages. These messages may be sent from a variety of sources and may be delivered to the mobile communication devices through a messaging gateway system.

The messaging gateway system may receive electronic messages from a variety of sources, such as from a variety of message provider systems. The messaging gateway system, however, may be limited in the amount of message traffic from the message provider systems which the messaging gateway system can receive and process.

To prevent an overload, the messaging gateway system may be configured to limit the amount of message traffic which each message provider system may send to the messaging gateway system. These limits may be fixed and may add up to the message traffic capacity of the messaging gateway system.

This configuration can suffer from inefficiencies and delays. For example, a message provider system may be receiving message traffic in an amount which is greater than the maximum amount of message traffic which has been allocated to it by the messaging gateway system. When this occurs, the message provider system may queue the messages, delaying their receipt by the mobile communication devices to whom the messages are addressed. While messages are being delayed by one message provider system, moreover, another message provider system may be delivering message traffic to the messaging gateway system at substantially below its allocated amount, thus wasting capacity in the messaging gateway system.

SUMMARY

A messaging gateway system may include a message gateway which delivers messages to a mobile communication system from each of a plurality of message provider systems which are delivered to the message gateway through a computer network communication system. A message traffic monitor may generate information indicative of the amount of message traffic received by the messaging gateway system from each of the message provider systems. A real-time message allocation computer may determine a maximum amount of message traffic for each of the message provider systems based on the information indicative of the amount of message traffic that is received by the messaging gateway system from each of the message provider systems.

The real-time message allocation computer may determine the number of messages that are received by the messaging gateway system from each of the message provider systems during a first period of time. It may also determine the maximum number of messages that each message provider system may send to the messaging gateway system during a subsequent, second period of time based on the number of messages that are received by the messaging gateway system from each of the message provider systems during the first period of time. The second period of time may immediately follow the first period of time. These determinations may be made periodically. The period of each determination may be between 1 and 60 seconds, such as every second.

The real-time message allocation computer may initially set the maximum amount of message traffic for each of the message provider systems to a default amount. The real-time message allocation computer may adjust that amount for each message provider system based on the information indicative of the amount of message traffic that is received by the messaging gateway system from the message provider systems.

The real-time message allocation computer may increase the maximum amount of message traffic from one or more of the message provider systems when the amount of message traffic that is received by the messaging gateway system from one or more of the other message provider systems is below a pre-determined amount.

The real-time message allocation computer may increase the maximum amount of message traffic from the one or more of the message provider systems by a cumulative amount which substantially equals the cumulative amount by which the message traffic from the one or more other message provider systems is below the pre-determined amount.

The real-time message allocation computer may increase the maximum amount of message traffic from those message provider systems which are delivering messages to the messaging gateway system at the pre-determined amount.

The real-time message allocation computer may increase the maximum amount of message traffic from the one or more of the message provider systems in substantially equal amounts.

The messaging gateway system may include a message throttling controller that may throttle each of the message provider systems so as to cause each of the message provider systems to send messages to the messaging gateway system at no more than the maximum amount of message traffic which the real-time message allocation computer determines for the message provider system.

The message throttling controller may throttle each of the message provider systems by delaying the delivery of one or more message acknowledgements to the message provider system by amounts necessary for causing the message provider system to deliver messages to the messaging gateway system at no more than the maximum amount of message traffic which the real-time message allocation computer determines for the message provider system.

The messaging gateway system may include a message allocation communication system that may communicate information indicative of each determined maximum amount of message traffic to its respective message provider system.

The message gateway may establish one or more communication channels with each message provider system. The maximum amount of message traffic from each message provider may represent the maximum cumulative amount of message traffic through all of the communication channels with the message gateway.

The message gateway may receive messages from the message provider systems in HTTP protocol, and the communication channels may be sockets.

A message provider system may include a message communication system that may receive messages addressed to one or more mobile communication devices and to deliver the messages to a messaging gateway system. A message traffic monitor may generate information indicative of the amount of message traffic that is delivered by the message provider system to the messaging gateway system. A message allocation communication system may receive from the messaging gateway system information indicative of the maximum amount of message traffic that may be sent by the message provider system to the messaging gateway system. A message delivery controller may throttle the messages from the message provider system to the messaging gateway system so that the message traffic does not exceed the maximum amount of message traffic.

The message allocation communication system may periodically receive information from the messaging gateway system indicative of the maximum amount of message traffic that may be sent by the message provider system to the messaging gateway system. The message delivery controller may periodically throttle the messages from the message provider system to the messaging gateway system so that the message traffic does not exceed the maximum amount of message traffic.

The message provider system may include an acknowledgement communication system that may receive an acknowledgement from the messaging gateway system of its receipt of each message by the messaging gateway system. The message delivery controller may delay the deliver of a message to the message gateway system until an acknowledgement is received from the messaging gateway system of the delivery of a previous message by the message provider system.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
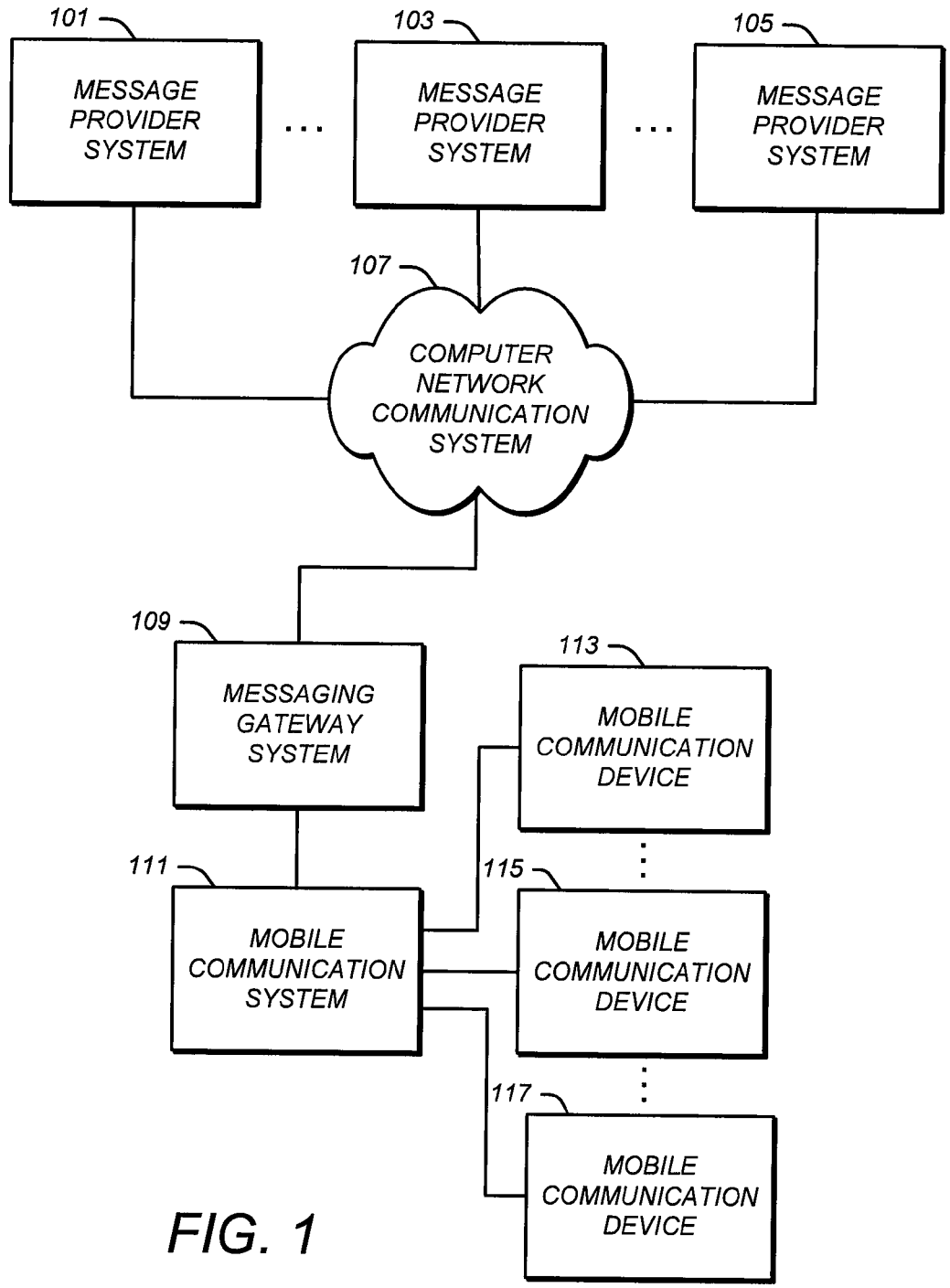
FIG. 1 illustrates a communication system that includes message provider systems, a computer network communication system, a messaging gateway system, a mobile communication system, and mobile communication devices.

FIG. 1 illustrates a communication system that includes message provider systems, a computer network communication system, a messaging gateway system, a mobile communication system, and mobile communication devices.

As illustrated in FIG. 1, the communication system may include one or more message provider systems, such as message provider systems 101, 103, and 105; one or more computer network communication systems, such as a computer network communication system 107; one or more messaging gateway systems, such as a messaging gateway system 109; one or more mobile communication systems, such as a mobile communication system 111; and one or more mobile communication devices, such as mobile communication devices 113, 115, and 117.

Each message provider system, such as the message provider system 101, 103, and/or 105, may be configured to receive messages from a variety of sources, such as from users of the message provider system, and to deliver them to one or more computer network communication systems, such as the computer network communication system 107.

The computer network communication system 107 may be configured to receive messages from message provider systems, such as the message provider systems 101, 103, or 105. The computer network communication system 107 may be configured to deliver these messages to the addresses specified in the messages, through, when appropriate, a messaging gateway system, such as the messaging gateway system 109.

The computer network communication system 107 may be of any type. For example, the computer network communication system may consist of or include the internet and/or one or more wide area networks and/or local area networks.

The messaging gateway system 109 may be configured to receive electronic messages from one or more message provider systems, such as the message provider systems 101, 103, and/or 105, through one or more computer network communication systems, such as through the computer network communication system 107. The messaging gateway system 109 may be configured to convert each received message into a format that is appropriate for a mobile communication system, such as the mobile communication system 111, and to then deliver that converted message to the mobile communication system.

The mobile communication system 111 may be configured to deliver each received message to the mobile communication device to which it is addressed, such as to the mobile communication devices 113, 115, and/or 117. The mobile communication system 111 may be configured to manage other communications with the mobile communication devices, such as voice and/or other types of data communications.

The mobile communication system 111 may be of any type. For example, the mobile communication system 111 may include one or more cellular networks.

The mobile communication devices, such as the mobile communication devices 113, 115, and 117, may be of any type. For example, they may consist of or include a cell phone, a laptop, a PDA, and/or any other type of device which is configured to receive electronic messages.

Figure 2:
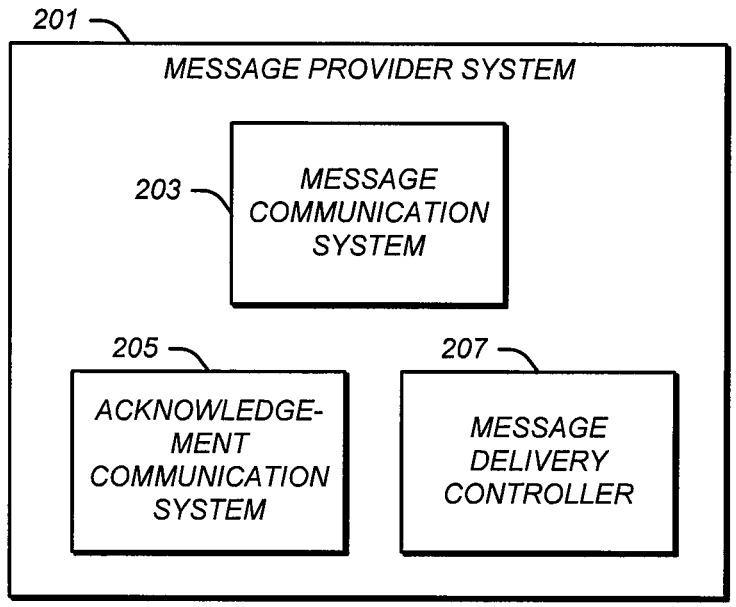
FIG. 2 illustrates a message provider system that is configured to deliver messages to a messaging gateway system.

FIG. 2 illustrates a message provider system 201 that is configured to deliver messages to a messaging gateway system. The message provider system 201 may function as one of the message provider systems illustrated in FIG. 1, such as the message provider system 101, 103, and/or 105, and/or may function as a message provider system in a different type of communication system. Similarly, the message provider systems 101, 103 and/or 105, may be of a type that is different than the message provider system 201.

The message provider system 201 may include a message communication system 203, an acknowledgment communication system 205, and a message delivery controller 207.

The message communication system 203 may be configured to receive messages addressed to one or more mobile communication devices and to deliver the messages to a messaging gateway system. The message communication system 203 may be configured to receive messages from a variety of sources, such as from one or more users of the message provider system 201. The messages may be received in any format, such as in XML or plain text format.

The message communication system 203 may be configured to establish one or more communication channels with the messaging gateway system. These channels, for example, may be in the form of sockets when the messages are in XML format.

The acknowledgment communication system 205 may be configured to receive acknowledgments from the messaging gateway system of the receipt of each message by the messaging gateway system.

The message delivery controller 207 may be configured to control the delivery of messages from the message provider system 201 to the messaging gateway system. For example, the message delivery controller 207 may be configured to delay the delivery of each message from the message provider system to the message gateway system until an acknowledgment is received from the messaging gateway system of the delivery of a previous message by the message provider system. This acknowledgement may be received by the acknowledgment communication system 205 and communicated to the message delivery controller 207.

Inclusion of the acknowledgment communication system 205 in conjunction with the message delivery controller 207 with may enable the messaging gateway system to remotely regulate the rate at which the message provider system 201 provides messages to the messaging gateway system.

Figure 3:
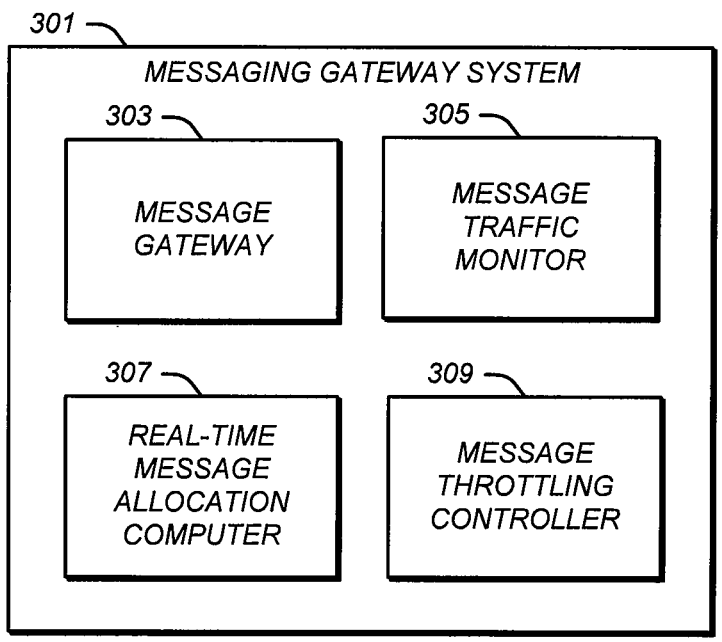
FIG. 3 illustrates a messaging gateway system that is configured to receive and throttle messages from message provider systems so that the message traffic from each message provider system does not exceed a maximum amount.

FIG. 3 illustrates a messaging gateway system that is configured to receive and throttle messages from message provider systems so that the message traffic from each message provider system does not exceed a maximum amount. The messaging gateway system 301 may be used as the messaging gateway system 109 illustrated in FIG. 1 or in connection with any other type of communication system. Similarly, the communication system illustrated in FIG. 1 may be used in connection with any other type of messaging gateway system.

The messaging gateway system 301 may include a message gateway 303, a message traffic monitor 305, a real-time message allocation computer 307, and a message throttling controller 309.

The message gateway 303 may be configured to deliver messages to a mobile communication system, such as to the mobile communication system 111 illustrated in FIG. 1, from one or more message provider systems, such as the message provider systems 101, 103, and/or 105 illustrated in FIG. 1. These messages may be delivered to the message gateway 303 through a computer network communication system, such as a computer network communication system 107 illustrated in FIG. 1.

The message gateway 303 may be configured to receive message in any format. For example, the message gateway may be configured to receive messages in XML and/or plane text format.

The message gateway 303 may be configured to convert received messages into any format. For example, the message gateway may be configured to convert messages into SMS and/or MMS format.

The message gateway 303 may be configured to establish one or more communication channels with each message provider system. These channels may be sockets, for example, when the messages are in XML format.

The message traffic monitor 305 may be configured to monitor the messages which are received by the messaging gateway system from each of the message provider systems and to generate information indicative of the amount of message traffic that is received by the messaging gateway system from each of the message provider systems.

The amount of message traffic may be expressed in any way. For example, the amount of message traffic may be expressed as the number of messages which are received within a timeframe, such as a timeframe between 1 and 60 seconds, such as within 1 second. The amount of message traffic may be expressed in other ways, such as the amount of bandwidth which the message traffic occupies.

The amount of message traffic may be based upon the number of messages which are received during a previous interval, such as an interval between 1 and 60 seconds, such as during the previous second. The measured amount of message traffic may represent an average of message traffic over several intervals. The weight given to each sample may be the same or different. For example, more recent samples may be given greater weight.

The message traffic monitor 305 may be configured to update the reported message traffic repeatedly, such as on a periodic basis. For example, the message traffic monitor 305 may be configured to update the reported rate at intervals between 1 and 60 seconds, such as every second.

The real-time message allocation computer 307 may be configured to determine a maximum amount of message traffic for each of the message provider systems. It may be configured to do so based on the information indicative of the amount of message traffic that is received by the messaging gateway system 301 from each of the message provider systems, as determined by the message traffic monitor 305.

The amount of message traffic may be expressed in any way. For example, the amount of message traffic may be expressed as the number of messages within a timeframe, such as a timeframe between 1 and 60 seconds, such as within 1 second. The amount of message traffic may be expressed in other ways, such as the amount of bandwidth which the message traffic occupies.

The real-time message allocation computer 307 may be configured to determine the number of messages that are received by the messaging gateway system from each of the message provider systems during a first period of time and to determine the maximum number of messages that each message provider system may send to the messaging gateway system during a subsequent, second period of time. This may be based on the number of messages that are received by the messaging gateway system from each of the message provider systems during the first period of time. The second period of time may immediately follow the first period of time or may be separated from the first period of time by an interval.

The real-time message allocation computer 307 may be configured to repeatedly determine the maximum number of messages that each message provider system may send, such as on a periodic bases. The period of the periodic basis may be of any length, such as between 1 and 60 seconds. For example, the length of the period may be one second.

The real-time message allocation computer 307 may be configured to initially set the maximum amount of message traffic for each of the message provider systems to a default amount. The default amount may be selected such that the total of all of the default amounts approximates or is less than the capacity of the messaging gateway system.

The real-time message allocation computer 307 may be configured to adjust the default amount for each of the message provider systems based on the information indicative of the amount of the message traffic that is received by the messaging gateway system 301 from each of the message provider systems.

The real-time message allocation computer 307 may be configured to increase the maximum amount of message traffic for one or more of the message provider systems when the message traffic from one or more of the other message provider systems is below its allocated amount, such as below the default amount.

The real-time message allocation computer 307 may be configured to increase the maximum amount of message traffic for the one or more of the message provider systems by a cumulative amount which substantially equals the cumulative amount by which the message traffic from the one or more other message provider systems is below its allocated amount, such as below the default amount.

The real-time message allocation computer 307 may be configured to increase the maximum amount of message traffic/or those message provider systems which are delivering messages to the message gateway system at their allocated amount, such as at the default amount.

The real-time message allocation computer may be configured to increase the maximum amount of message traffic for the one or more message provider systems in substantially equal amounts.

For example, the messaging gateway system 301 may be receiving messages from fifty different message provider systems. The messaging gateway system 301 may initially allocate a maximum default amount of message traffic to each message provider system, such as, for example, a maximum default amount of 200 messages per second. During the first second of operation, the message traffic from thirty of the message provider systems may have been below 200 messages per second. On the other hand, the message traffic from twenty of the message provider systems may have been at 200 messages per second during the same first second. This suggests a likelihood that other messages from these twenty message provider systems are being queued and thus delayed by these twenty message provider systems.

Based on this information, which may be received from the message traffic monitor 305, the real-time message allocation computer 307 may determine that the maximum amount of message traffic from the twenty message provider systems that just sent their full allocation of messages should be increased. The cumulative amount of the increase may substantially equal the cumulative amount by which the messages from the other thirty message provider systems were below their allocated about. The real-time message allocation computer 307 may increase the maximum amount of message traffic rate from each of these twenty message provider systems by an equal amount. This may result in faster delivery of messages from the twenty message provider systems without slowing the messages from the other thirty provider systems. The real-time message allocation computer 307 may be configured to reduce the maximum amount of the message traffic allocation from the thirty message provider systems in a cumulative amount which equals the cumulative amount of the increase, make no change to any of the amounts, or make changes to only some of the amounts.

The real-time message allocation computer 307 may be configured to update these maximum amount determinations periodically, such as during a period that is between 1 and 60 seconds, such as every second.

The real-time message allocation computer 307 may be configured to limit the aggregate of all of the maximum message traffic allocations to the capacity of the real-time message allocation computer 307.

The message throttling controller 309 may be configured to throttle each of the message provider systems so as to cause each of the message provider systems to send messages to the messaging gateway system 301 at no more than the maximum amount of message traffic which the real-time message allocation computer 307 has determined for the message provider system. The message throttling controller 309 may be configured to throttle each of the message provider systems by delaying the delivery of one or more message acknowledgments to the message provider system by an amount necessary for causing the message provider system to deliver messages to the messaging gateway system 301 at no more than the maximum amount of message traffic which the real-time message allocation computer 307 determined for the message provider system.

The throttling may be implemented in any way. For example, the message throttling controller 309 may be configured to immediately acknowledge the receipt of every message from a message provider system until the amount of messages sent by the message provider system has reached the maximum amount of messages allocated to the message provider system during a particular time period. Once the allotment is reached, the message throttling controller 309 may delay the acknowledgment of the message which caused the allotment to be reached until the next throttling period. In a different configuration, the message throttling controller 309 may delay the acknowledgments of each message from a message provider system for an amount which collectively limits the total number of messages from the message provider system during a measurement period to the maximum amount determined by the real-time message allocation computer 307.

Figure 4:
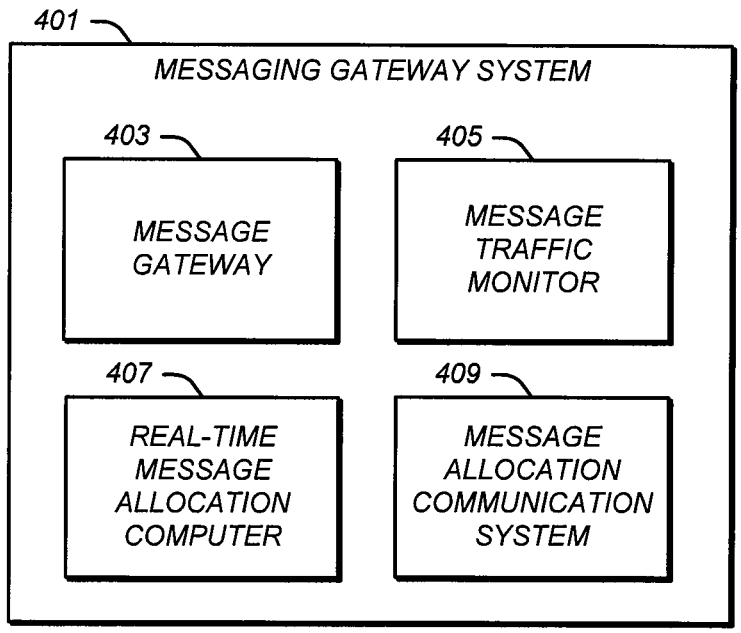
FIG. 4 illustrates a messaging gateway system that is configured to communicate to message provider systems a maximum amount of message traffic that may be sent by each message provider system to the messaging gateway system.

FIG. 4 illustrates a messaging gateway system that is configured to communicate to message provider systems a maximum amount of message traffic that may be sent by each message provider system to the messaging gateway system. The messaging gateway system 401 may be used as the messaging gateway system 109 illustrated in FIG. 1 or in connection with any other type of communication system. Similarly, the messaging gateway system 109 may be different.

The messaging gateway system 401 may include a message gateway 403, a message traffic monitor 405, a real-time message allocation computer 407, and a message allocation communication system 409.

The message gateway 403, the message traffic monitor 405, and the real-time message allocation computer 407 may be the same as the message gateway 303, the message traffic monitor 305, and the real-time message allocation computer 307, that are illustrated in FIG. 3 and discussed above.

Instead of having a message throttling controller, like the message throttling controller 309, however, the messaging gateway system 401 may instead have a message allocation communication system 409. The message allocation communication system 409 may be configured to communicate information indicative of each maximum amount of message traffic determined by the real-time message allocation computer 407 to its respective message provider system. The information may be expressed in any form, such as in the form of a maximum amount and/or a deviation from a default amount. With this configuration, the maximum amount determination may still be made in the messaging gateway system 401 by the real-time message allocation computer 407, but the throttling may be performed in each message provider system, as explained below.

Figure 5:
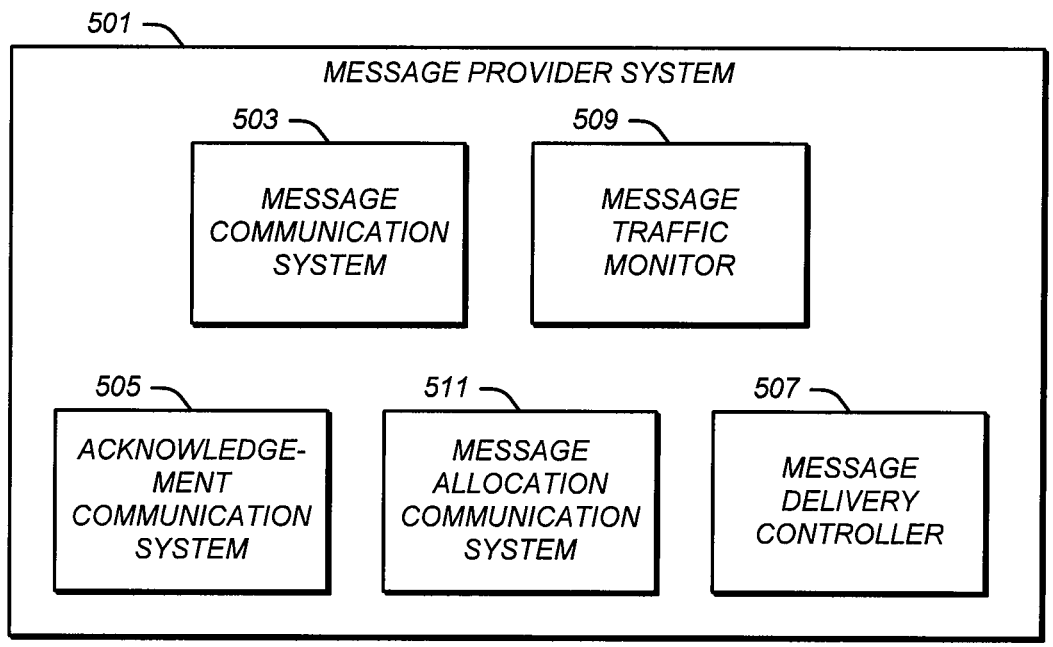
FIG. 5 illustrates a message provider system that is configured to deliver message traffic to a messaging gateway system at a maximum amount that is communicated to the message provider system by the messaging gateway system.

FIG. 5 illustrates a message provider system that is configured to deliver message traffic to a messaging gateway system at a maximum amount that is communicated to the message provider system by the messaging gateway system. The message provider system 501 may be used as the message provider system 101, 103, and/or 105 illustrated in FIG. 1, or in connection with any other type of communication system. The message provider system 101, 103, and/or 105 may instead be different.

The message provider system 501 may include a message communication system 503, an acknowledgment communication system 505, a message delivery controller 507, a message traffic monitor 509, and a message allocation communication system 511.

The message communication system 503, the acknowledgment communication system 505, and the message delivery controller 507 may be the same as the message communication system 203, the acknowledgment communication system 205, and the message delivery controller 207, respectively, that is illustrated in FIG. 2 and discussed above.

The message traffic monitor 509 may similarly be the same as the message traffic monitor 405 that is illustrated in FIG. 4 and discussed above. However, the message traffic monitor 509 may be configured to only monitor the message traffic delivered by the message provider system 501 to one or more messaging gateway systems. In the event that the message provider system 501 is configured to deliver messages to more than a single messaging gateway system, the message traffic monitor 509 may be configured to separately monitor the message traffic to each of the messaging gateway systems.

The message allocation communication system 511 may be configured to receive from a messaging gateway system information indicative of the maximum amount of message traffic that may be sent by the message provider system 501 to the messaging gateway system. As indicated above, the maximum amount may be expressed in any format, such as in the form of an absolute number or a deviation from a default number.

The message delivery controller 507 may be configured to throttle the messages from the message provider system 501 to the messaging gateway system so that their amount does not exceed the maximum amount received by the message allocation communication system 511. Much like the message throttling controller 309 illustrated in FIG. 3 and discussed above, the message delivery controller 507 may be configured to do so by periodically pausing the message traffic each time after the maximum amount has been realized, and/or by providing smaller pauses after the delivery of each message.

Figure 6:
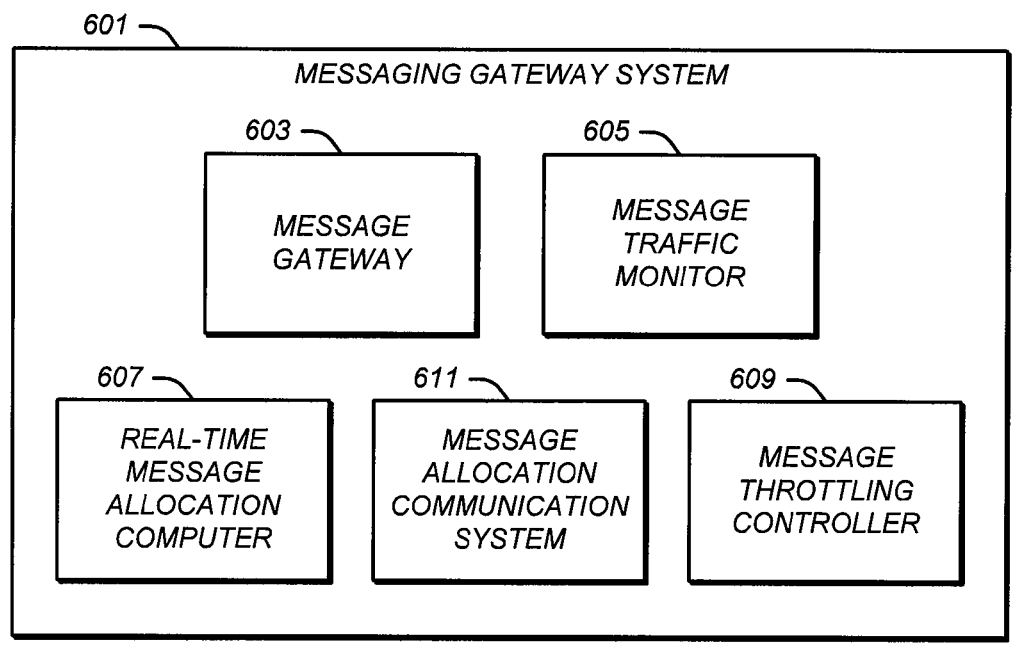
FIG. 6 illustrates a messaging gateway system that is configured to receive messages from message provider systems, to communicate to each message provider system the maximum amount of message traffic which the message provider system may send to the messaging gateway system, and to throttle the messages from each message provider system so that the message traffic does not exceed the maximum amount.

FIG. 6 illustrates a messaging gateway system that is configured to receive messages from message provider systems, to communicate to each message provider system the maximum amount of message traffic which the message provider system may send to the messaging gateway system, and to throttle the messages from each message provider system so that the message traffic does not exceed the maximum amount.

As illustrated in FIG. 6, the messaging gateway system may include a message gateway 603, a message traffic monitor 605, a real-time message allocation computer 607, a message throttling controller 609, and a message allocation communication system 611.

The message gateway 603, the message traffic monitor 605, the real-time message allocation computer 607, and the message throttling controller 609 may be the same as the message gateway 303, the message traffic monitor 305, the real-time message allocation computer 307, and the message throttling controller 309, respectively, illustrated in FIG. 3 and discussed above. Similarly, the message allocation communication system 611 may be the same as the message allocation communication system 511 illustrated in FIG. 5.

The messaging gateway system 601 may have the capabilities of both the messaging gateway system 301 illustrated in FIG. 3 and the messaging gateway system 401 illustrated in FIG. 4. It may send maximum message traffic allocation amounts to the message provider systems using the message allocation communication system 611 for enforcement of these maximum amounts by the message provider systems. It may instead enforce these maximum amounts itself using the message throttling controller 609. The messaging gateway 601 may also do both. It may send the maximum message traffic allocation amounts to the message provider systems for enforcement of these maximum amounts by the message provider systems, and it may also enforce these maximum amounts itself as a backup.

The various components which have been discussed, including the message provider systems and messaging gateway systems, may consist of or include one or more computing systems. Each computing system may include one or more programmable processors; one or more memory devices such as hard disk drivers, flash drives, CDs, DVDs; and one or more interface devices, such as keyboards, mice, displays, and communication ports. Each computing system may include software, such as one or more operating systems and application programs. Each application program may include one or more algorithms configured to implement the functions of the component for which the application program is implementing, such as the functions described above for the message communication systems 203 and 503; the acknowledgement communication systems 205 and 505; the message delivery controllers 207 and 507; the message gateways 303, 403, and 603; the message traffic monitors 305, 405, 509, and 605; the real-time allocation computers 307, 407, and 607; the message throttling controllers 309 and 609; and the message allocation communication systems 409, 511, and 611.

The various software programs may initially be stored on computer-readable storage media, such as one or more CDs, DVDs, hard disk drives, flash memories, PROMS, and/or ePROMS. These software programs may contain computer-readable instructions which, when read by a computing system, cause the computing system to perform the operations dictated by the instructions.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A messaging gateway system comprising:
   a message gateway configured to deliver messages, addressed to one or more mobile communication devices, to a mobile communication system from each of a plurality of message provider systems which are delivered to the message gateway through a computer network communication system;
   a message traffic monitor configured to generate information indicative of the amount of message traffic received by the messaging gateway system from each of the message provider systems;
   a real-time message allocator configured to determine a maximum amount of message traffic to be delivered by the mobile communication system for the one or more mobile communication devices from each of the message provider systems based on the information indicative of the amount of message traffic that is received by the messaging gateway system from each of the message provider systems; and
   a message allocation communication system configured to communicate information indicative of each determined maximum amount of message traffic to a respective message provider system.

2. The messaging gateway system of claim 1 wherein the real-time message allocator is configured to determine the number of messages that are received by the messaging gateway system from each of the message provider systems during a first period of time and to determine the maximum number of messages that each message provider system may send to the messaging gateway system during a subsequent, second period of time based on the number of messages that are received by the messaging gateway system from each of the message provider systems during the first period of time.

3. The messaging gateway system of claim 2 wherein the second period of time immediately follows the first period of time.

4. The messaging gateway system of claim 2 wherein both determinations are made periodically.

5. The messaging gateway system of claim 4 wherein the period of each determination is between 1 second and 60 seconds.

6. The messaging gateway system of claim 1 wherein the real-time message allocator is configured to initially set the maximum amount of message traffic for each of the message provider systems to a default amount and to adjust that amount for each message provider system based on the information indicative of the amount of message traffic that is received by the messaging gateway system from the message provider systems.

7. The messaging gateway system of claim 1 wherein the real-time message allocator is configured to increase the maximum amount of message traffic from one or more of the message provider systems when the amount of message traffic that is received by the messaging gateway system from one or more of the other message provider systems is below a pre-determined amount.

8. The messaging gateway system of claim 7 wherein the real-time message allocator is configured to increase the maximum amount of message traffic from the one or more of the message provider systems by a cumulative amount which substantially equals the cumulative amount by which the message traffic from the one or more other message provider systems is below the pre-determined amount.

9. The messaging gateway system of claim 7 wherein the real-time message allocator is configured to increase the maximum amount of message traffic from those message provider systems which are delivering messages to the messaging gateway system at the pre-determined amount.

10. The messaging gateway system of claim 7 wherein the real-time message allocator is configured to increase the maximum amount of message traffic from the one or more of the message provider systems in substantially equal amounts.

11. The messaging gateway system of claim 1 further comprising a message throttling controller that is configured to throttle each of the message provider systems so as to cause each of the message provider systems to send messages to the messaging gateway system at no more than the maximum amount of message traffic which the real-time message allocator determines for the message provider system.

12. The messaging gateway system of claim 11 wherein the message throttling controller is configured to throttle each of the message provider systems by delaying the delivery of one or more message acknowledgements to the message provider system by amounts necessary for causing the message provider system to deliver messages to the messaging gateway system at no more than the maximum amount of message traffic which the real-time message allocator determines for the message provider system.

13. The messaging gateway system of claim 11, wherein the message throttling controller is further configured to:
   acknowledge, in real-time, receipt of one or more messages from a specific message provider system, during a particular time period, until a number of messages sent by the specific message provider system has reached a maximum number of messages allocated to the specific message provider system during the particular time period; and
   delay, until an end of the particular time period, acknowledgement of receipt of one or more messages from the specific message provider system, during the particular time period, after the number of messages sent by the specific message provider system has reached the maximum number of messages allocated to the specific message provider system.

14. The messaging gateway system of claim 13, wherein the maximum number of messages allocated to the specific message provider system is determined by the real-time message allocator.

15. The messaging gateway system of claim 13, wherein the message throttling controller limits the number of messages sent by the specific message provider system during the particular time period as a result of the acknowledging receipt and the delaying acknowledging receipt.

16. The messaging gateway system of claim 1 wherein the message gateway is configured to establish a plurality of communication channels with each message provider system and wherein the maximum amount of message traffic from each message provider represents the maximum cumulative amount of message traffic through all of the communication channels with the messaging gateway system.

17. The messaging gateway system of claim 16 wherein the message gateway is configured to receive messages from the message provider systems in HTTP protocol and wherein the communication channels are sockets.

18. The messaging gateway system of claim 1, wherein the messaging gateway system is configured to communicate the information indicative of each determined maximum amount of message traffic to the respective message provider system, for enforcement, at the respective message provider system, of the determined maximum amount of message traffic.

19. The messaging gateway system of claim 18, wherein the messaging gateway system is further configured to enforce, at the messaging gateway system, the determined maximum amount of message traffic for the respective message provider system, as a backup.

20. A message provider system comprising:
a message communication system configured to receive messages addressed to one or more mobile communication devices and to deliver the messages to a messaging gateway system of a mobile communication system;
a message traffic monitor configured to generate information indicative of the amount of message traffic that is delivered by the message provider system to the messaging gateway system;
a message allocation communication system configured to receive from the messaging gateway system information indicative of the maximum amount of message traffic that may be sent by the message provider system to the messaging gateway system for delivery through the mobile communication system to the one or more mobile communication devices and to communicate the information indicative of the maximum amount of message traffic to a respective message provider system; and
a message delivery controller configured to throttle the messages from the message provider system to the messaging gateway system so that the message traffic does not exceed the maximum amount of message traffic.

21. The message provider system of claim 20 wherein:
the message allocation communication system is configured to periodically receive information from the messaging gateway system indicative of the maximum amount of message traffic that may be sent by the message provider system to the messaging gateway system; and
the message delivery controller is configured to periodically throttle the messages from the message provider system to the messaging gateway system so that the message traffic does not exceed the last-received maximum amount of message traffic.

22. The message provider system of claim 20 wherein the message communication system is configured to establish a plurality of communication channels with the messaging gateway system and wherein the maximum amount of message traffic is construed by the message delivery controller as the maximum cumulative amount of message traffic through all of the communication channels with the messaging gateway system.

23. The message provider system of claim 20 further comprising an acknowledgement communication system that is configured to receive an acknowledgement from the messaging gateway system of its receipt of each message by the messaging gateway system and wherein the message delivery controller is configured to delay the delivery, of a message to the message gateway system until an acknowledgement is received from the messaging gateway system of the delivery of a previous message by the message provider system.

24. The message provider system of claim 20, wherein the message delivery controller is configured to throttle the messages from the message provider system to the messaging gateway system so that the message traffic does not exceed the maximum amount of the message traffic by periodically pausing the message traffic after the maximum amount of the message traffic has been reached.

25. The message provider system of claim 20, wherein the message delivery controller is configured to throttle the messages from the message provider system to the messaging gateway system so that the message traffic does not exceed the maximum amount of the message traffic by periodically pausing the message traffic, wherein a length of a pause after a delivery of a current message is shorter than a length of a pause after a delivery of a previous message.

26. A system comprising:
a mobile communication system comprising one or more cellular networks configured to provide message communication service for mobile communication devices;
a message gateway configured to deliver messages, addressed to one or more of the mobile communications devices, to the mobile communication system from each of a plurality of message provider systems which the message gateway receives through a computer network communication system;
a message traffic monitor configured to generate information indicative of the amount of message traffic received by the messaging gateway system from each of the message provider systems;
a real-time message allocator configured to determine a maximum amount of message traffic to be delivered by the mobile communication system for the one or more mobile communication devices from each of the message provider systems based on the information indicative of the amount of message traffic that is received by the messaging gateway system from each of the message provider systems; and
a message allocation communication system configured to communicate information indicative of each determined maximum amount of message traffic to a respective message provider system.

* * * * *